United States Patent [19]

Stephan

[11] Patent Number: 4,964,647
[45] Date of Patent: Oct. 23, 1990

[54] SHAFT SEALING RING

[75] Inventor: Bernd Stephan, Remscheid-Lennep, Fed. Rep. of Germany

[73] Assignee: Goetze AG, Burscheid, Fed. Rep. of Germany

[21] Appl. No.: 285,386

[22] Filed: Dec. 16, 1988

[30] Foreign Application Priority Data

Dec. 23, 1987 [DE] Fed. Rep. of Germany ....... 3743843
Feb. 12, 1988 [DE] Fed. Rep. of Germany ....... 3804284

[51] Int. Cl.$^5$ .............................................. F16J 15/32
[52] U.S. Cl. .................................................... 277/153
[58] Field of Search ................................ 277/153, 152

[56] References Cited

U.S. PATENT DOCUMENTS 3,921,990 11/1975 Johnston et al. ................ 277/153 X
3,921,992 11/1975 Bertin ............................. 277/153 X

FOREIGN PATENT DOCUMENTS 199445 4/1956 Austria ................................ 277/153
2333182 1/1974 Fed. Rep. of Germany .

OTHER PUBLICATIONS

Mathias Kammuller und Heinz Konrad Muller, "Physikalische Ursachen der Dichtwirkung von Radial-Wellendichtringen", [Physical Aspects of the Sealing Mechanism of Elastomer Rotary Shaft Seals], ATZ Automobhiltechnische Zeitschrift 88, 1986, pp. 39–45.

Primary Examiner—Allan N. Shoap
Attorney, Agent, or Firm—Spencer & Frank

[57] ABSTRACT

An article for use as a shaft sealing ring for sealing a fluid medium includes an elastomeric body, a housing member, and a sealing lip having a sealing edge; the sealing edge, when installed about a shaft, being radially deformed and contacting a surface of the shaft along a running zone having a first end adjoining the fluid medium and a second end adjoining the environment to be sealed from the fluid medium; the sealing edge, when in a non-installed condition, having an annular surface of varying inner diameter along the running zone; the smallest of the varying inner diameter lying closer to the first end than to the second end.

7 Claims, 1 Drawing Sheet ns at the sealing edge. The deformation of the rubber material against the shaft surface in the region of the sealing edge produces a running zone which has a defined contact width. Upon rotation of the shaft, a liquid film flows underneath a side of the sealing edge which is in contact with the fluid medium, such that the sealing edge does not directly contact the shaft surface. Although the liquid can flow underneath the sealing edge and form a lubricating film, it does not flow to the side of the seal which is in contact with the air environment.

A sealing theory published in ATZ Automobiltechnische Zeitschrift 88 (1986), pages 39–45, explains this phenomenon. The shaft sealing ring has a sealing edge with first and second walls that form the sealing edge. In a cross-sectional view taken through this shaft sealing ring, the first and second walls forming the sealing edge appear as generally linear portions which are inclined relative to the shaft surface and to each other such that they meet at the sealing edge. In this example, the wall which is in contact with the fluid medium is disposed at an angle relative to the shaft surface which is in a range between 40° and 50°, while the other wall which is in contact with the air environment is disposed at an angle relative to the shaft surface which is in a range between 20° and 30°, so that, in the installed condition of the shaft sealing ring about the shaft, the compression forces in the sealing edge are distributed asymmetrically relative to the cross section of the sealing lip. The deformation of the shaft sealing ring in its installed condition is, therefore, also asymmetrical along its axial direction. This structure permits the development of a hydrodynamic conveying effect from the side of the sealing edge contacting the environment (e.g., air) to the side of the sealing edge contacting the fluid medium.

For economic reasons, presently manufactured shaft sealing rings predominantly have pressed-on sealing edges. Subsequent working by grinding or stamping is therefore not necessary. The consequence of this manufacturing process is that the two walls forming the sealing edge do not meet at an entirely sharp edge, and instead meet at a transition region having an arcuate cross-sectional outline having a constant radius of curvature. When installed, a shaft sealing ring according to the prior art, having a pressed-on sealing edge, exhibits an initial axial distribution of compression whose maximum lies approximately in the center of the width of the contact area in the running zone. Only after the seal has been worn in, will the angles of the two walls forming the sealing edge have an influence on the distribution of the compression forces. During the wearing-in process, the angles of inclination of the two walls forming the sealing edge are not determinative of the presence of the hydrodynamic sealing effect, and instead the transition region between the angled walls performs the sealing function.

SUMMARY OF THE INVENTION

It is an object of the present invention to improve the sealing effect of a shaft sealing ring in such a way that, even from the beginning of the wearing-in period, i.e. right from the start of use of the shaft sealing ring, an optimum sealing effect is realized.

This is accomplished according to the invention in that the sealing ring includes an elastomeric body, a housing member, and a sealing lip having a sealing edge; the sealing edge, when installed about a shaft, being radially deformed and contacting a surface of said shaft along a running zone having a first end adjoining the fluid medium and a second end adjoining the environment to be sealed from the fluid medium; the sealing edge, when in a non-installed condition, having a annular surface of varying inner diameter along the running zone; the smallest of the varying inner diameter lying closer to the first end than to the second end.

According to the invention, the housing member can be reinforced, and the sealing lip can be spring biased. Furthermore, each sealing edge can be pressed and vulcanized such that the curved portions of the sealing edge have minimum radii of about 0.05 mm. Additionally, the sealing edge has a transition region provided to connect the first and second curved portions forming the sealing edge, the transition region being axially tangent to the two curved portions. This produces, in an advantageous manner, a relatively wide (in the axial direction) sealing edge cross-section and an improved sealing effect. To optimize the distribution of compressive forces in the sealing edge, it is preferred that the tangent line forming the transition region extend at an acute angle to the shaft surface.

The above-described configurational variations can be realized particularly easily employing known manufacturing techniques. It additionally appears to be of advantage for optimum design of the sealing edge cross-section, in view of various influential factors such as, for example, the material of the sealing lip, the fluid medium to be sealed, the geometry of the sealing lip and other factors, to configure the sealing edge outline for each particular case according to a mathematically defined function, with the maximum of the curvature being placed along the axial extent of the sealing edge adjacent to the wall which contacts the fluid medium to be sealed.

The invention will be described in greater detail below with reference to an embodiment which is illustrated in the drawings.

DESCRIPTION OF THE PREFERRED EMBODIMENT

Figure 1:
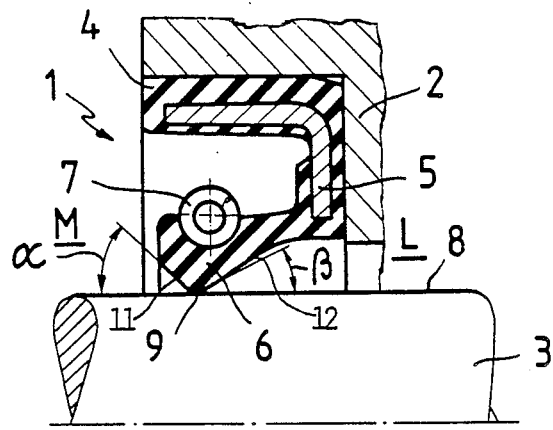
FIG. 1 is a cross-sectional side view of an upper portion of a shaft sealing ring installed about a shaft.

A shaft sealing ring 1 is shown in section in FIG. 1 installed in a machine part 2 to seal a shaft 3 which has a shaft surface 8. The shaft sealing ring 1 is made of an elastomer material and includes a housing member 4 and a sealing lip 6. A stiffening ring 5 is vulcanized into the housing member 4. The shaft sealing ring 1 further includes a spring ring 7 which lies about the exterior portion of the sealing lip 6. Near the shaft surface 8, the cross-section of the sealing lip 6 has a generally triangular shape. The sealing lip has first and second lower walls 11 and 12 which are generally planar and which are connected by a sealing edge 9. The first and second walls 11 and 12 extend respectively at angles $\alpha$ and $\beta$, and meet to form a sealing edge 9 which is pressed on the shaft sealing ring 1 already in the vulcanizing mold. The letter M identifies the first side of the shaft sealing ring 1, adjoining the fluid medium, and the letter L identifies the second side, adjoining the environment (e.g., air).

Figure 2:
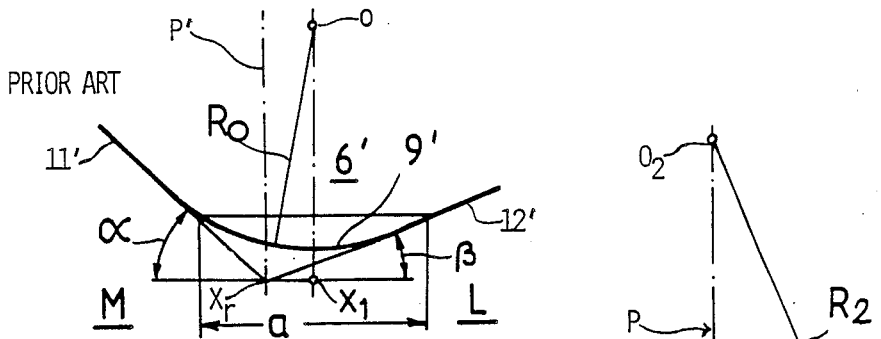
FIG. 2 is an enlarged side view of an outline of a section of a prior art sealing edge.

FIG. 2 is an enlarged view of a sealing lip 6' having the present customary configuration. By finish pressing, the sealing edge 9' is formed as an annular surface having an arcuate transition region (appearing in section as a sector of a circle having its origin at 0 and a radius of curvature $R_o$) connecting the walls 11' and 12' which are respectively disposed at angles $\alpha$ and $\beta$ relative to the sealing axis (i.e., the axis of the sealing ring), with the radius $R_o$ of the transition region having a value of about 0.05 mm. In an installed state of the shaft sealing ring 1, the sealing edge 9' becomes a defined running zone which, during the wear-in phase, has a defined contact width a. Since the radius $R_o$ is constant, deformation of the sealing edge 9' is substantially uniform, and therefore the inner diameter of the sealing edge 9' lies approximately in the center $X_1$ of the contact width a even though the walls 11' and 12', if extended linearly, would meet at a point $X_r$ which lies within the vertical plane P'.

Figure 3:
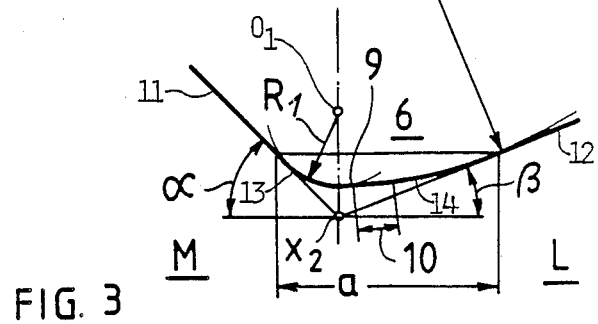
FIG. 3 is an enlarged side view of an outline of a section of a sealing edge according to the invention

FIG. 3 is an enlarged view of a region of a sealing lip 6 having a sealing edge 9 which, when installed about a shaft, is radially deformed and contacts a surface of the shaft along a running zone having a contact width a. The sealing edge 9, when in an un-installed condition (and therefore undeformed condition) prior to installation about a shaft, has an annular surface of varying inner diameter along the running zone. According to the invention, the annular surface of axially varying inner diameter is composed essentially of first and second curved portions 13 and 14, respectively, having different radii $R_1$ and $R_2$, and a transition region 10 connecting the first and second curved portions 13 and 14 and tangent to both. The first and second walls 11 and 12 meet at a point $X_2$ through which a vertical plane P passes. The radius $R_1$ lies in the plane P and has its origin at point $O_1$, while the radius $R_2$ also lies in the plane P and has its origin at the point $O_2$. The radius $R_1$ has a smaller magnitude than the radius $R_2$, and therefore the curved portion 13 is more sharply curved compared to the curved portion 14. The curved portion 13 lies on the side of the shaft sealing ring 1 which contacts the fluid medium M and forms the inner diameter of the shaft sealing ring 1 (i.e., the inner diameter of the shaft sealing ring 1 is measured from that part of the curved portion 13 which intersects the plane p). Since the radius $R_2$ produces less of a curvature than does the radius $R_1$, the curved portion 14 extends further than the curved portion 13 and therefore the transition region 10 lies at an acute angle to the sealing axis. As a result, the inner diameter of the shaft sealing ring 1 is adjacent the wall 11 and adjoins the fluid medium side M of the contact surface having the contact width a.

In order to produce a sealing edge 9 which is fluid-tight during the wear-in stage, the asymmetric cross-sectional outline of the sealing lip 6 can also be produced corresponding to one or more mathematical functions up to the third degree.

It will be understood that the above description of the present invention is susceptible to various modifications, changes and adaptations, and the same are intended to be comprehended within the meaning and range of equivalents of the appended claims.

What is claimed is:

1. In a shaft sealing ring adapted to be coaxially inserted on a shaft for sealing a fluid medium from the environment; including an elastomeric body forming a housing and a sealing lip integral with and projecting generally axially from said housing; said sealing lip having a sealing edge constituted by an annular sealing surface; said shaft sealing ring having a non-installed, relaxed state in which said annular sealing surface has a varying inner diameter as viewed in axial section taken across any radius of the seal; said shaft sealing ring having an installed state in which said shaft sealing ring surrounds a shaft to be sealed and said annular sealing surface is radially deformed to conform to an outer face of the shaft along an axial length portion thereof; said axial length portion defining a running zone of said shaft sealing ring; said running zone having a first end adjoining, in the installed state, the fluid medium and a second end adjoining, in the installed state, the environment to be sealed from the fluid medium; the improvement wherein said annular sealing surface has, in said non-installed state, a first curved portion adjacent said first end having a first radius of curvature as viewed in axial section taken across any radius of the seal, a second curved portion adjacent said second end having a second radius of curvature as viewed in axial section taken across any radius of the seal, and a smallest inner diameter which is located, when viewed in said uninstalled state, along said first curved portion closer to said first end than to said second end; said first radius of curvature and said second radius of curvature respectively having different radii of curvature.

2. A shaft sealing ring as defined in claim 1, further comprising a transition region connecting said first and second curved portions, said first curved portion having a smaller radius of curvature than said second curved portion, and wherein said first curved portion is disposed for contact with the fluid medium to be sealed when installed about a shaft.

3. A shaft sealing ring as defined in claim 1, wherein said transition region is axially tangent to respective adjacent ends of said first and second curved portions.

4. A shaft sealing ring as defined in claim 3, wherein said transition region extends at an acute angle to the sealing axis.

5. A shaft sealing ring as defined in claim 1, wherein said housing member is reinforced.

6. A shaft sealing ring as defined in claim 1, wherein said sealing lip has a first wall at said first end which extends axially at a first predetermined angle, and a second wall adjacent said second end which extends axially at a second predetermined angle; said second predetermined angle being smaller than said first predetermined angle;

in said uninstalled state, said first curved portion extends from said first wall to a location beyond said smallest inner diameter of said annular sealing surface, said transition region extends substantially linearly as viewed axially, and said second curved portion adjacent said transition region has a second radius of curvature as viewed in axial section taken across any radius of the seal which extends from said second end to said second wall.

7. A shaft sealing ring as defined in claim 6, wherein a line extending in the plane of said first wall and a line extending in the plane of said second wall intersect at a predetermined location as viewed axially, said smallest inner diameter of said annular sealing surface being coplanar with said predetermined location and being spaced a predetermined distance from said predetermined location in a direction which is transverse to the axial direction.

* * * * *